(12) United States Patent
Katori et al.

(10) Patent No.: US 10,683,814 B2
(45) Date of Patent: Jun. 16, 2020

(54) CONTROL METHOD OF INTERNAL COMBUSTION ENGINE

(71) Applicant: HONDA MOTOR CO., LTD., Tokyo (JP)

(72) Inventors: Yuto Katori, Wako (JP); Hideyuki Hayashi, Wako (JP); Daisuke Shiomi, Wako (JP); Yuichi Masukake, Wako (JP); Ryuji Yokote, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/122,415

(22) Filed: Sep. 5, 2018

(65) Prior Publication Data
US 2019/0072043 A1 Mar. 7, 2019

(30) Foreign Application Priority Data
Sep. 7, 2017 (JP) .................. 2017-171635

(51) Int. Cl.
| | |
|---|---|
| *F02D 13/06* | (2006.01) |
| *F02D 13/02* | (2006.01) |
| *F02D 41/00* | (2006.01) |
| *F01L 9/02* | (2006.01) |
| *F02D 37/02* | (2006.01) |
| *F01L 13/00* | (2006.01) |
| *F02D 17/02* | (2006.01) |

(52) U.S. Cl.
CPC ................ *F02D 13/06* (2013.01); *F01L 9/02* (2013.01); *F02D 13/0215* (2013.01); *F02D 37/02* (2013.01); *F02D 41/0002* (2013.01); *F02D 41/0087* (2013.01); *F01L 13/0005* (2013.01); *F01L 2013/001* (2013.01); *F01L 2800/05* (2013.01); *F02D 17/02* (2013.01); *F02D 2041/001* (2013.01); *F02D 2041/0012* (2013.01); *F02D 2250/21* (2013.01)

(58) Field of Classification Search
CPC ...... F02D 13/06; F02D 13/0215; F02D 37/02; F02D 41/002; F02D 41/0087; F01L 9/02
See application file for complete search history.

(56) References Cited

U.S. PATENT DOCUMENTS

| | | | | |
|---|---|---|---|---|
| 2011/0239987 A1* | 10/2011 | Maehara | ................. | F01L 1/181 123/406.46 |
| 2015/0345407 A1* | 12/2015 | Glugla | .................... | F02D 17/02 123/403 |

FOREIGN PATENT DOCUMENTS

| | | |
|---|---|---|
| JP | 2000-337182 A | 12/2000 |
| JP | 2011-214509 A | 10/2011 |

* cited by examiner

*Primary Examiner* — Kevin A Lathers
(74) *Attorney, Agent, or Firm* — Westerman, Hattori, Daniels & Adrian, LLP

(57) ABSTRACT

A preparation control for suppressing fluctuation of an output torque of the engine at the time of executing switching operation from the whole cylinder operation to the partial cylinder operation is executed when having made a switching request from the whole cylinder operation to the partial cylinder operation, the valve operation phase is fixed to a predetermined phase before executing the switching operation, and the cylinder deactivation mechanism is controlled so as to execute the switching operation at a target switching time which is prefixed by corresponding to the predetermined phase. The target switching time is previously set to a timing at which abnormal noises are not generated, by corresponding to the valve operation phase fixed to the predetermined phase.

8 Claims, 7 Drawing Sheets

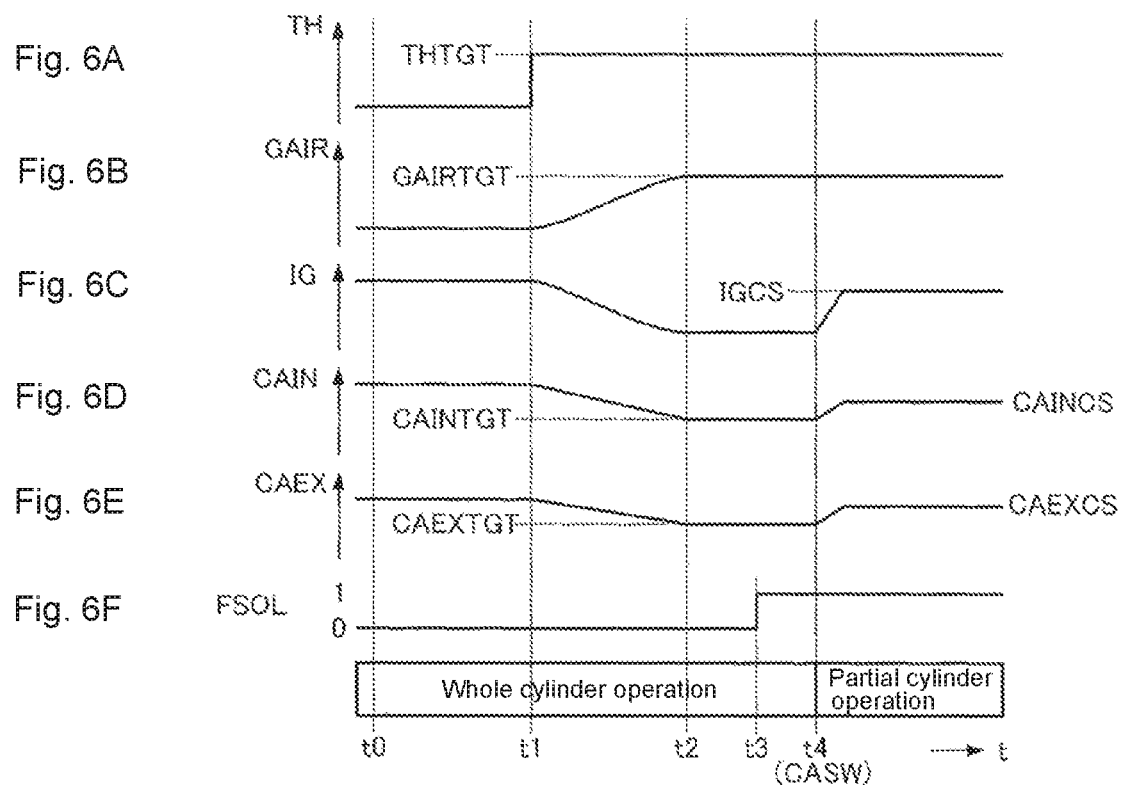

Fig. 10
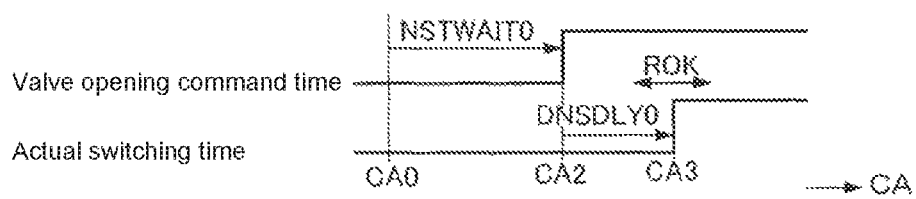
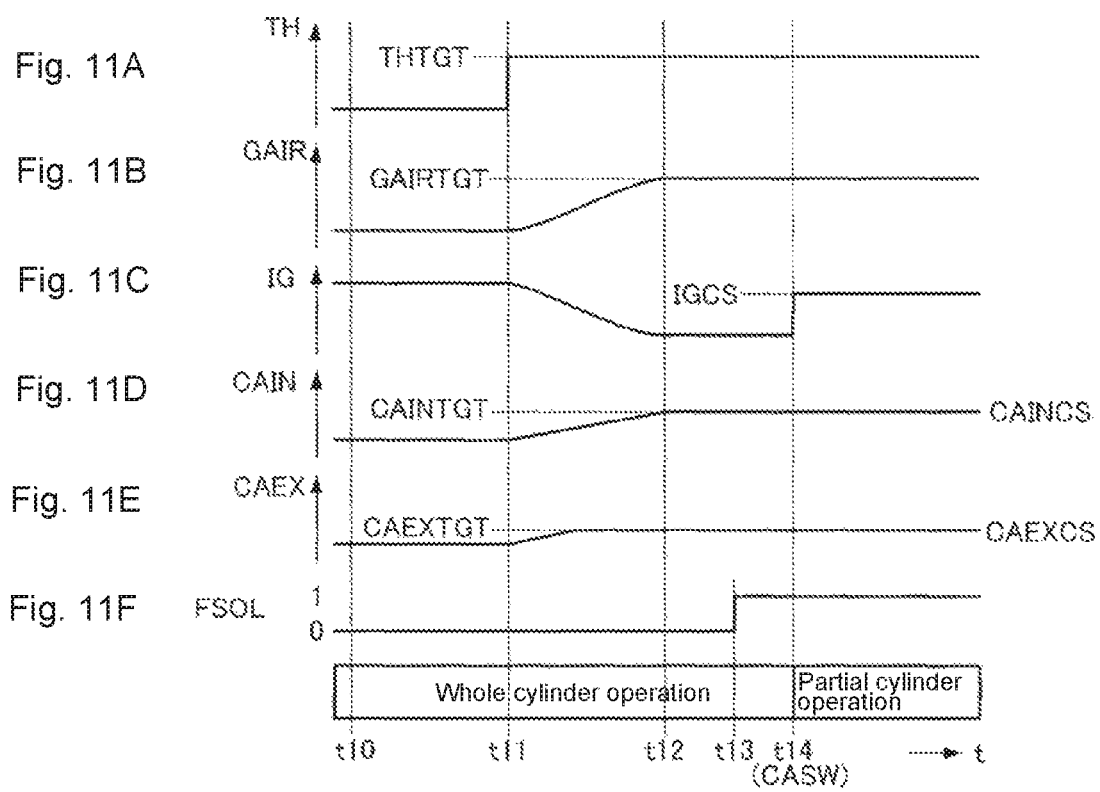

CONTROL METHOD OF INTERNAL COMBUSTION ENGINE

CROSS REFERENCES TO RELATED APPLICATIONS

The present application claims priority under 35 U.S.C. § 119 to Japanese Patent Application No. 2017-171635, filed Sep. 7, 2017, entitled "CONTROL METHOD OF INTERNAL COMBUSTION ENGINE." The contents of this application are incorporated herein by reference in their entirety.

TECHNICAL FIELD

The present disclosure relates to a control method of an internal combustion engine provided with plural cylinders, and more particularly, to the control method of the internal combustion engine provided with a cylinder deactivation mechanism performing switching between partial cylinder operation in which a part of plural cylinders is operated and whole cylinder operation in which all of the cylinders are operated, and a valve operation phase variable mechanism for changing an operation phase of an intake valve and/or exhaust valve which are provided with each of the cylinders.

BACKGROUND

In Japanese Patent application Laid-Open Publication No. 2000-337182, there is shown a control device of an internal combustion engine which is provided with the above mentioned cylinder deactivation mechanism and valve operation phase variable mechanism for changing an operation phase of an intake valve. According to this control device, transient control for gradually changing from the valve operation phase for the whole cylinder operation to the valve operation phase for the partial cylinder operation is executed at the time of being shifted from the whole cylinder operation to the partial cylinder operation. According to this transient control, it is set that a transition speed of the valve operation phase decreases as a difference between an engine output torque at the time of operating the whole cylinders and the engine output torque at the time of operating the part of cylinders increases.

SUMMARY

Since there may be cases where abnormal noises are generated attributable to timing executing a switching operation depending upon a configuration of the cylinder deactivation mechanism, the timing executing the switching operation from the whole cylinder operation to the partial cylinder operation is necessary to be determined taking a operation condition (valve operation phase) of a valve operation condition variable mechanism into consideration. The control device of the Japanese Patent application Laid-Open Publication No. 2000-337182 is a device characterizing the control method of an intake valve operation phase after having executed switching from the whole cylinder operation to the partial cylinder operation, and does not take suppression of the abnormal noises in accordance with the switching operation into consideration.

It is desirable to provide a control method capable of accurately executing transient control at the time of being shifted from whole cylinder operation to partial cylinder operation and capable of preventing generation of abnormal noises at the time of executing switching operation from whole cylinder operation to the partial cylinder operation in an internal combustion engine provided with a cylinder deactivation mechanism and a valve operation phase variable mechanism for changing an operation phase of an intake valve and/or exhaust valve.

According to first aspect of embodiments, a control method of an internal combustion engine which comprises a plurality of cylinders, a valve operation phase variable mechanism for changing a valve operation phase of at least one of an intake valve and an exhaust valve provided in each of the plurality of cylinders, and a cylinder deactivation mechanism for performing switching between partial cylinder operation in which a part of the plural cylinders is operated and whole cylinder operation in which all of the cylinders are operated, characterized in that the method comprises a step a for executing a preparation control for suppressing fluctuation of an output torque of the engine at the time of executing switching operation from the whole cylinder operation to the partial cylinder operation when having made a switching request from the whole cylinder operation to the partial cylinder operation, a step b for fixing the valve operation phase (CAIN, CAEX) to a predetermined phase (CAINTGT, CAEXTGT) before executing the switching operation, and a step c for outputting a switching command signal to the cylinder deactivation mechanism based on a target switching time (NSTBST) which is prefixed by corresponding to the predetermined phase.

With this configuration, the preparation control for suppressing the fluctuation of the engine output torque at the time of executing the switching operation from the whole cylinder operation to the partial cylinder operation is executed when having made the switching request from the whole cylinder operation to the partial cylinder operation. The valve operation phase is fixed to the predetermined phase before executing the switching operation, and the switching command signal is outputted to the cylinder deactivation mechanism based on the target switching time prefixed by corresponding to the predetermined phase. In the case where the abnormal noises are generated depending upon the timing at which the switching operation is executed, it is confirmed that the timing at which the abnormal noises are not generated changes depending upon the valve operation phase. Accordingly, the target switching time which becomes the timing (optimum switching time) at which the abnormal noises are not generated is prefixed by corresponding to the valve operation phase fixed to the predetermined phase, and the switching command signal is outputted based on the target switching time, so that the generation of the abnormal noises can be easily prevented. Further, since the optimum switching time is not changed by fixing the valve operation phase before executing the switching operation, the switching operation is executed in its earlier stages as compared with the case where the valve operation phase is not fixed, so that fuel economy can be improved.

According to the second aspect, the predetermined phase (CAINTGT, CAEXTGT) is set to the valve operation phase in which a switching crank angle range (ROK) suitable for executing the switching operation is relatively expanded, and the target switching time (NSTBST) is set within the switching crank angle range.

With this configuration, the predetermined phase on which the valve operation phase is fixed is set to the valve operation phase in which the switching crank angle range suitable for executing the switching operation of the cylinder deactivation mechanism is relatively expanded, and the target switching time for executing the switching operation is set within the switching crank angle range. The switching crank angle range is a crank angle range in which the abnormal noises are not generated at the time of executing the switching operation, for example, and the extent changes depending upon the valve operation phase. Accordingly, since the predetermined phase is set to the valve operation phase in which the switching crank angle range is relatively expanded, the generation of the abnormal noises is more accurately prevented at the time of the executing the switching operation.

According to third aspect, in the step c, an output time (NSTWAIT: NSTBST−DNSDLY) of the switching command signal is calculated in accordance with an operation delay time (DNSDLY) of the cylinder deactivation mechanism (40) in such a manner that the switching operation is executed at the target switching time (NSTBST).

According to this configuration, since the output time of the switching command signal is determined in accordance with the operation delay time of the cylinder deactivation mechanism in such a manner that the switching operation is executed at the target switching time, an actual switching time can easily coincide with the target switching time in spite of the operation delay of the cylinder deactivation mechanism.

According to fourth aspect, the cylinder deactivation mechanism (40) is provided with a switching mechanism part (43) for switching between an operation condition and a deactivation condition of the intake valve and the exhaust valve of the cylinder to be deactivated in the partial cylinder operation, the switching operation is executed by changing hydraulic oil pressure (POIL) supplied to the switching mechanism part, and the output time (NSTWAIT) of the switching command signal is calculated in accordance with rotational frequency (NE) of the engine and the hydraulic oil pressure (POIL).

According to this configuration, the switching command time is determined in accordance with the hydraulic oil pressure supplied to the switching mechanism part of the cylinder deactivation mechanism and the rotational frequency of the internal combustion engine. It is confirmed that the operation delay time of the cylinder deactivation mechanism changes depending upon the hydraulic oil pressure. Further, the switching command time needs to be determined by a rotation phase (crank angle) of the internal combustion engine. Therefore, the actual switching operation execution time can coincide accurately with the target switching time by determining the switching command time in accordance with the hydraulic oil pressure and the engine rotational frequency. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

FIGS. 6A-6F are each a time chart for explaining a transient control from time in which the execution condition of the partial cylinder operation was effected to time which is actually shifted to the partial cylinder operation.

FIG. 10 is a time chart for explaining the processing of FIG. 8.

FIGS. 11A-11F are each a time chart for explaining a modified embodiment of the transient control shown in FIGS. 6A-6F.

DETAILED DESCRIPTION

Figure 1:
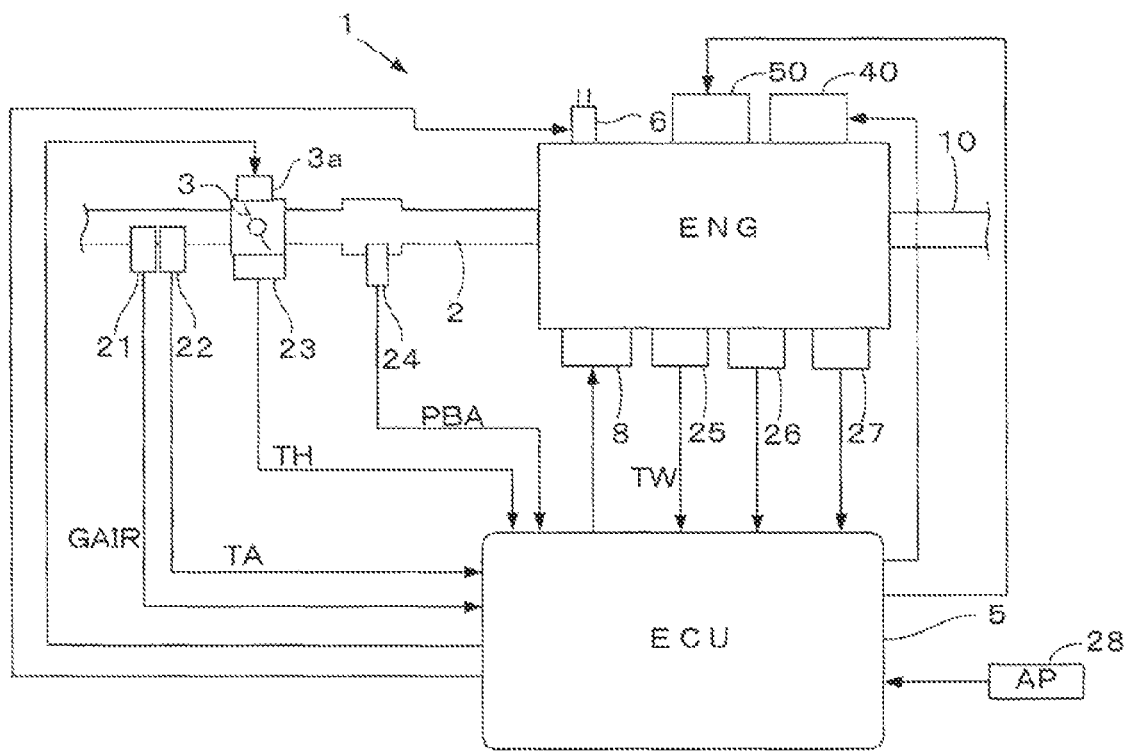
FIG. 1 is a diagram showing the configuration of an internal combustion engine and a control device thereof in accordance with an embodiment of the present disclosure.

Hereinafter, an embodiment of the present disclosure will be explained with reference to accompanying drawings. FIG. 1 is a diagram showing the configuration of an internal combustion engine and a control device thereof in accordance with an embodiment of the present disclosure. The internal combustion engine (hereinafter, referred to as "engine") 1 shown in this drawing has six cylinders, and injectors 6 for directly injecting fuel into combustion chambers are provided in each of the cylinders. The operation of the injector 6 is controlled by an electronic control unit (hereinafter, referred as "ECU") 5. Further, an ignition plug 8 is mounted on each cylinder of the engine 1. The ignition time by the ignition plug 8 is controlled by the ECU 5. A throttle valve 3 is arranged in an intake passage 2 of the engine 1.

To the ECU 5 there are connected an intake air flow rate sensor 21 for detecting an intake air flow rate GAIR of the engine 1, an intake air temperature sensor 22 for detecting an intake air temperature TA, a throttle valve opening sensor 23 for detecting a throttle valve opening TH, an intake air pressure sensor 24 for detecting an intake air pressure PBA, a cooling water temperature sensor 25 for detecting an engine cooling water temperature TW, a crank angle sensor 26 for detecting a rotation angle of a crankshaft (not shown) of the engine 1, a cam angle sensor 27 for detecting a rotation angle of a camshaft (not shown) on which a cam for driving the intake valve and the exhaust valve of the engine 1 is mounted, an accelerator sensor 28 for detecting an operation amount AP of an accelerator pedal for a vehicle driven by the engine 1, and other sensors (not shown) (such as an air fuel ratio sensor for detecting an air fuel ratio AP, a vehicle speed sensor and the like). Detected signals of these sensors are supplied to the ECU 5. The crank angle position sensor 26 outputs a pulse signal showing a crank angle position, for example, at every 6 degrees of the crank angle, and this pulse signal is used for various kinds of timing control such as the fuel injection time, the ignition time, and the like, and the detection of the engine rotational frequency (rotation speed) NE.

The engine 1 is provided with a cylinder deactivation mechanism 40 which temporarily deactivates operation of the cylinders #1~#3, and is configured to be switchable between the partial cylinder operation in which the cylinders #4~#6 only are operated and the whole cylinder operation in which all cylinders are operated according to a driving condition of the engine 1. A publicly known technique as shown in, for example, a patent document, Japanese Patent Application Laid-Open Publication NO. 2011-214509, and its counterpart US 2011/0239987 and the like is applicable to the cylinder deactivation mechanism 40. The contents of JP 2011-214509 and US 2011/0239987 are incorporated herein by reference in their entirety. In the partial cylinder operation, a valve closed condition is maintained with respect to the intake valve and the exhaust valve of the deactivation cylinder. The ECU 5 performs the switching control between the partial cylinder operation and the whole cylinder operation. For example, the partial cylinder operation is executed in a cruise condition in which the vehicle driven by the engine 1 travels at a relatively low, almost constant vehicle speed.

Figure 2:
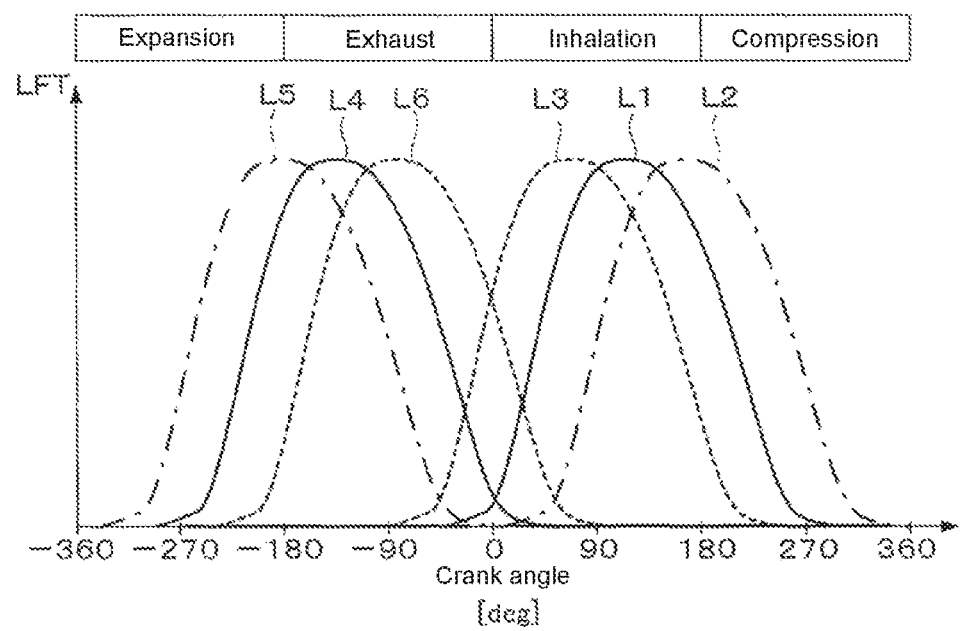
FIG. 2 is a diagram for explaining the operation with respect to a valve operation phase variable mechanism.

Further, the engine 1 is provided with a valve operation phase variable mechanism 50 which changes the operation phase with respect to the intake valve and the exhaust valve of each cylinder. The valve operation phase variable mechanism 50 has a well-known configuration, and the intake valve has an operation characteristic shown by a solid line L1 in FIG. 2 as a center and is driven in the phase from the most delayed phase shown by an alternate long and short dash line L2 to the most advanced phase shown by a dashed line L3 in accordance with the change of the operation phase of the cam for the intake valve. The exhaust valve has the operation characteristic shown by a sold line L4 in FIG. 2 as a center and is driven in the phase from the most advanced phase shown by an alternate long and short dash line L5 to the most delayed phase shown by a dashed line L6 in accordance with the change of the operation phase of the cam for the exhaust valve. An intake valve operation phase CAIN has the most delayed phase as a reference "0" and is defined such that the intake valve operation phase increases with an advance in phase. An exhaust valve operation phase CAEX has the most advanced phase as a reference "0" and is defined such that the exhaust valve operation phase increases with a delay in phase. The intake valve operation phase CAIN and the exhaust valve operation phase CAEX can be detected from a relative relationship between the output pulse of the cam angle sensor 27 which detects the rotation angle of corresponding cam shaft and the output pulse of the crank angle sensor 26.

Figure 3:
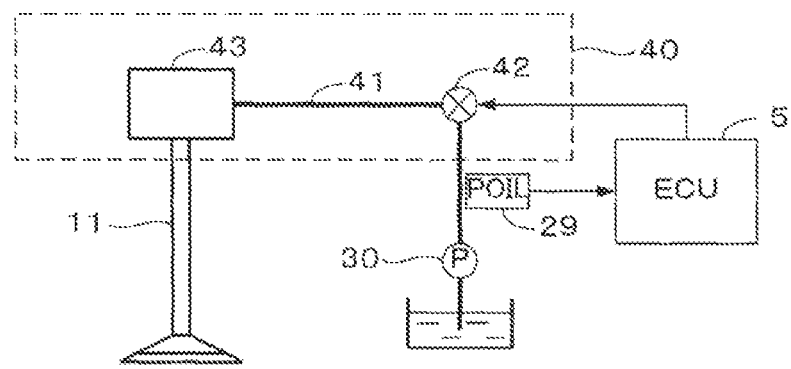
FIG. 3 is a schematic diagram for explaining the configuration of a cylinder deactivation mechanism.

FIG. 3 is a schematic diagram for explaining the configuration of a cylinder deactivation mechanism 40 (intake valve side). The cylinder deactivation mechanism 40 is provided with an oil passage 41 connected to an oil pump 30, an electromagnetic valve 42 located on the way of the oil passage 41, and a switching mechanism part 43 to which the hydraulic oil pressure is supplied through the oil passage 41. The valve closing condition of the electromagnetic valve 42 is an operating condition in which the intake valve 11 is driven by rotation of the cam. On the other hand, when the relatively high hydraulic oil pressure is supplied to the switching mechanism part 43 by opening the electromagnetic valve 42, a pin within the switching mechanism part 43 is moved and becomes a deactivation condition in which the intake valve 11 maintains the valve closing condition in spite of rotation of the cam. The oil pressure sensor 29 for detecting a hydraulic oil pressure POIL is provided in the oil passage 41, and the detection signal thereof is supplied to the ECU 5. The exhaust valve side of the cylinder deactivation mechanism 40 also is similarly configured.

The ECU 5 has a well-known configuration provided with a CPU, a memory, an input/output circuit and the like, and performs a fuel injection control by an injector 6, an ignition time control by an ignition plug 8, an intake air flow amount control by an actuator 3a and the throttle valve 3, a valve operation phase control by a valve operation phase variable mechanism 50, and the switching control between the partial cylinder operation and the whole cylinder operation by the cylinder deactivation mechanism 40 in accordance with the engine driving condition (mainly, engine rotational frequency NE and target torque TRQCMD). The target torque TRQCMD is mainly calculated in accordance with the accelerator pedal operation amount AP, and configured such that the target torque increases as the accelerator pedal operation amount AP increases. Further, a target intake air flow amount GAIRCMD is calculated in accordance with the target torque TRQCMD and configured so as to be substantially proportional to the target torque TRQCMD. An intake air flow amount control which drives throttle valve 3 by the actuator 3a is performed such that the actual intake air flow amount GAIR coincides with the target intake air flow amount GAIRCMD. Since an air amount which is inhaled per one ignition cycle into the combustion chamber of each cylinder by the intake air flow amount control increases or decreases in accordance with the increase or decrease of the intake air flow amount, it is also called an intake air flow amount control.

A fuel injection amount (mass) GINJ by the injector 6 is controlled by correcting a basic fuel amount GINJB calculated by using the intake air flow amount GAIR, by using a correction factor such as an air fuel ratio correction factor KAF and the like in accordance with an air fuel ratio AF detected by the air fuel ratio sensor. Herein, the fuel injection amount GINJ is converted by using a well-known method into a valve opening time TOUT of the injector 6 in accordance with a fuel pressure PF, a fuel density and the like and controlled in such a manner that the fuel amount supplied to the combustion chamber per one cycle becomes the fuel injection amount GINJ.

Figure 4:
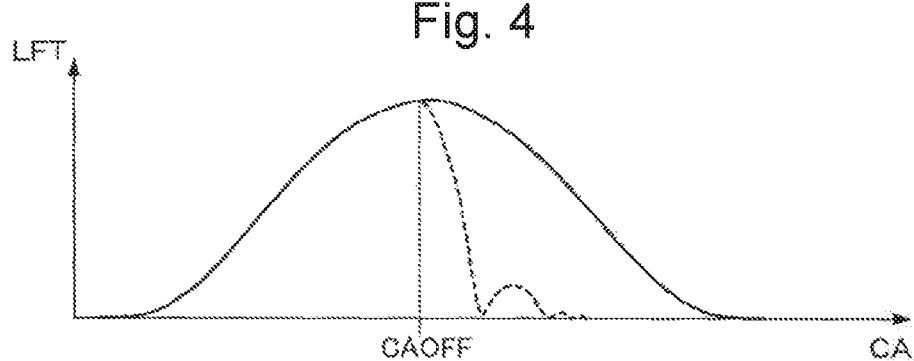
FIG. 4 is a view showing a lift curve of an intake valve for explaining abnormal noises (switching noises) generated at the time of performing the switching between whole cylinder operation and partial cylinder operation.

The abnormal noises (hereinafter, referred to as "switching noise") may be generated depending upon a relative relationship between a switching command time (valve opening command time CAOP of the electromagnetic valve 42), and, the intake valve operation phase CAIN and the exhaust valve operation phase CAEX when executing the switching between the whole cylinder operation and the partial cylinder operation. A solid line of FIG. 4 shows a lift curve at time of normal operation of the intake valve, and the dashed line is the crank angle CAOFF and shows a transition of a lift amount LFT at the time of having shifted to a deactivation condition. As shown in this drawing, the switching noises are inclined to be generated, when the lift amount LFT shifts to the deactivation condition in a state in which the lift amount LFT is relatively large. This is similarly applied to the exhaust valve.

FIGS. 5A-5D are each a time chart for explaining a relationship between the valve opening command time CAOP and a crank angle range RNS (hereinafter, referred to as "noise generation range RNS") apt to generate the switching noises. In FIGS. 5A-5D, the horizontal axis is the crank angle CA and the vertical axis is the lift amount LFT of the intake valve and exhaust valve. Since the switching noises are generated when the valve opening command time CAOP resides within the noise generation range RNS, an optimum valve opening command time CABST resides on the outside of the noise generation range RNS (hereinafter, referred to as "noise absence range RNN") and in a center position of a noise absence range RNN.

This drawing schematically shows the transition of the lift amounts of the intake valve and the exhaust valve of the cylinders #1~#3 which deactivates the operation during the partial cylinder operation. The solid line corresponds to the intake valve and the dashed line corresponds to the exhaust valve. To make the explanation plain, the maximum value of the lift amount of the intake valve is shown slightly larger than the maximum value of the lift amount of the exhaust valve. A time delay (hereinafter, referred to as "response delay time IDLY") resides until time (hereinafter, referred to as "actual shifting time CASW") actually shifting to the cylinder deactivation condition by the increase of the oil pressure within the switching mechanism part 43 from the valve opening command time CAOP, so that the noise generation range RNS becomes a relatively small angle range in the lift amount LFT.

Figure 5A:
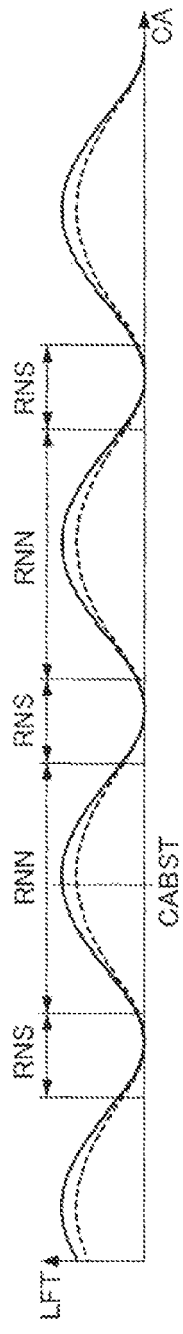
FIGS. 5A-5D are each a time chart for explaining a relationship between a valve opening command time (CAOP) and a crank angle range (RNS) the switching noises is easily generated.
Figure 5B:
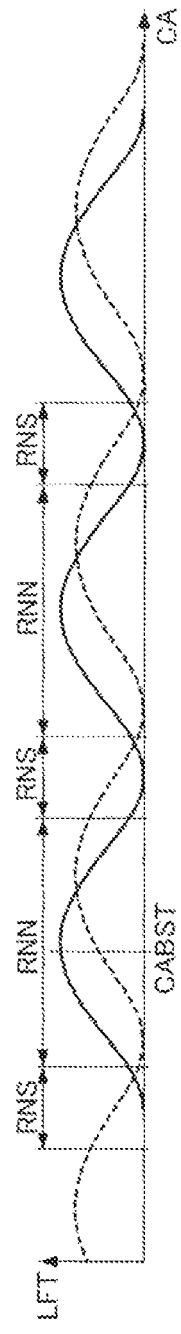
Figure 5C:
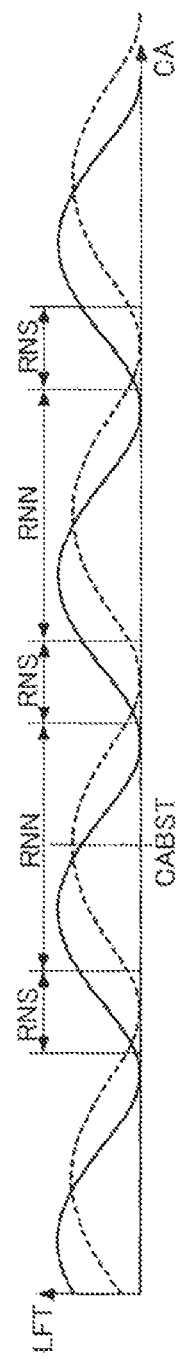
Figure 5D:
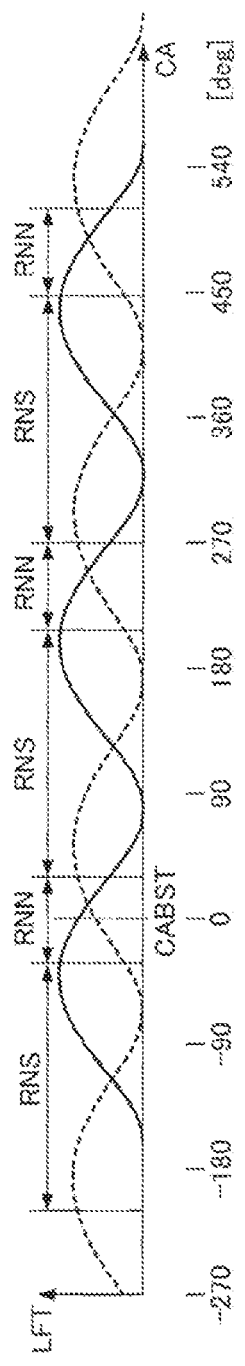

FIG. 5A corresponds to a condition (hereinafter, referred to as "reference condition") where the intake valve operation phase CAIN and the exhaust valve operation phase CAEX are zero degrees each other. FIG. 5B corresponds to a condition of CAIN=50 degrees and CAEX=0 degrees, and FIG. 5C corresponds to a condition of CAIN=0 degrees and CAEX=50 degrees. FIG. 5D corresponds to a condition of CAIN=50 degrees and CAEX=50 degrees.

The zero degrees in the horizontal axis correspond to the optimum valve opening command time CABST in the reference condition shown in FIG. 5A. As shown in FIG. 5B, when only the intake valve operation phase CAIN advances, the optimum valve opening command time CABST is shifted to the advanced side. As shown in FIG. 5C, when only the exhaust valve operation phase CAEX is delayed, the optimum valve opening command time CABST is shifted to the delayed side. In the condition as shown in FIG. 5D, although the optimum valve opening command time CABST becomes zero degrees similarly to the reference condition, the noise absence range RNN becomes very narrow, and the possibility of the generation of the switching noises are increased by a slight lag of the valve opening command time CAOP.

As mentioned above, in order to make the valve opening command time CAOP coincide with the optimum valve opening command time CABST, the valve opening command time CAOP is required to change in accordance with the intake valve operation phase CAIN and the exhaust valve operation phase CAEX. In this embodiment, as mentioned later, when the execution condition of the partial cylinder operation was effected, a preparation control for suppressing the fluctuation of output torque of the engine 1 in the actual shifting time CASW is executed, and the intake valve operation phase CAIN and the exhaust valve operation phase CAEX each are fixed on a predetermined intake valve operation phase CAINTGT and a predetermined exhaust valve operation phase CAEXTGT until the preparation time is completed. Then, the valve opening command time CAOP is determined in accordance with the predetermined intake valve operation phase CAINTGT and the predetermined exhaust valve operation phase CAEXTGT. In that time, the response delay time TDLY is considered, and it is considered that the response delay time TDLY mainly changes by depending upon the hydraulic oil pressure POIL. The predetermined intake valve operation phase CAINTGT and the predetermined exhaust valve operation phase CAEXTGT, in this embodiment, are set to such a phase (for example, the phase being "0" degrees each as shown in FIG. 5A) that the above mentioned noise absence phase RNN is relatively expanded.

FIGS. 6A-6F are each a time chart for explaining a transient control from the time in which the execution condition of the partial cylinder operation was effected to the time (CASW) which is actually shifted to the partial cylinder operation. FIGS. 6A-6F show the transition with respect to the throttle valve opening TH, the intake air flow amount GAIR, the ignition time IG, the intake valve operation phase CAIN, the exhaust valve operation phase CAEX, and a valve opening command flag FSOL of the electromagnetic valve 42, respectively. In the operation example shown in FIGS. 6A-6F, the target torque TRQCMD of the engine 1 is maintained at a constant value.

When the execution condition of the partial cylinder operation is effected in the time t0, the processing which calculates the switching time target throttle valve opening THTGT and a switching time target intake air flow amount GAIRTGT based on the target torque TRQCMD of the engine 1, as the target value at the time of execution of the switching from the whole cylinder operation to the partial cylinder operation, is executed, and the processing for decreasing the degree of engagement of a lock-up clutch of an automatic transmission (not shown) which is connected to the crankshaft of the engine 1, is executed.

The throttle valve opening TH is increased up to a switching time target throttle valve opening THTGT in the time t1. Consequently, since the intake air flow amount GAIR begin to gradually increase, the ignition time delay angle control for delaying the ignition time IG and the valve operation phase control which allows the intake valve operation phase CAIN and the exhaust valve operation phase CAEX to be shifted to the above mentioned predetermined intake valve operation phase CAINTGT and predetermined exhaust valve operation phase CAEXTGT at a predetermined speed by corresponding to the increase of the intake air flow amount GAIR in order to maintain the engine output torque TRQ so as to be the target torque TRQCMD are executed cooperatively. In the operation example shown in this drawing, the valve operation phase control in which the intake valve operation phase CAIN and the exhaust valve operation phase CAEX each decrease is executed.

In the time t2, the intake air flow amount GAIR reaches the switching time target intake air flow amount GAIRTGT, and the preparation control for suppressing the fluctuation of output torque at the time of executing the switching operation is completed, so that the optimum valve opening command time CABST is calculated. After that, the operation has to wait until the time t3 in which the rotation phase of the engine 1 coincides with the optimum valve opening command time CABST. In the time t3 which corresponds to the optimum valve opening command time CABST, the switching operation by the switching mechanism part 43 is executed in the time t4 (corresponding to an actual shifting time CASW) by performing the valve opening command of the electromagnetic valve 42, and is shifted to the partial cylinder operation. The period from the time t3 to the time t4 corresponds to the response delay time TDLY of the cylinder deactivation mechanism 40. After the time t4, the intake valve operation phase CAIN and the exhaust valve operation phase CAEX each are promptly shifted to the operation phases CAINCS and CAEXCS suitable for the partial cylinder operation, and the ignition time IG is promptly shifted to the ignition time IGCS suitable for the partial cylinder operation.

The torque fluctuation in the actual shifting time CASW can be suppressed by executing the transient control like this, and the generation of the switching noises can be prevented.

Further, although, in FIGS. 6A-6F, the operation example in which the intake valve operation phase CAIN and the exhaust valve operation phase CAEX each reach the predetermined intake valve operation phase CAINTGT and the predetermined exhaust valve operation phase CAEXTGT in the time t2 at which the preparation control is completed is shown, they may reach the predetermined intake valve operation phase CAINTGT and the predetermined exhaust valve operation phase CAEXTGT after the time t0 and in its earlier stages than the time t2.

Figure 7:
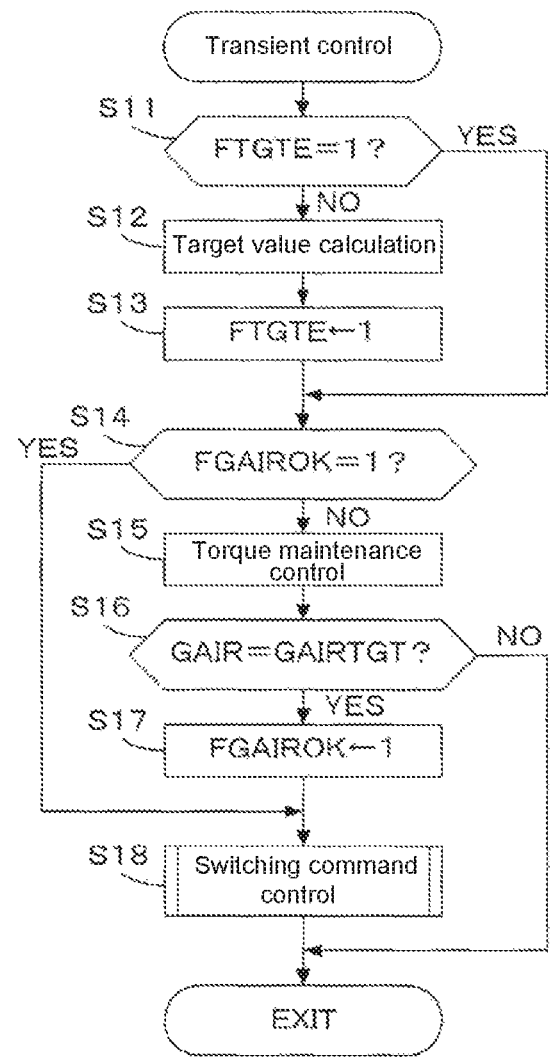
FIG. 7 is a flow chart of processing for executing the transient control shown in FIGS. 6A-6F.

FIG. 7 is a flow chart of processing for executing the above mentioned transient control. This processing is executed in every predetermined crank angle (for example, 30 degrees) by the ECU 5 from the time in which the execution condition of the partial cylinder operation was effected. All of the initial value of the flag used in this processing is set to "0".

In a step S11, whether or not a target value calculation completion flag FTGTE is "1" is determined. The answer is initially a denial (NO), and the switching time target opening THTGT and the switching time target intake air flow amount GAIRTGT are calculated by proceeding to a step S12. In a step S13, the target value calculation completion flag FTGTE is set to "1" and the processing proceeds to a step S14. Accordingly, the processing proceeds from the step S11 directly to the step S14.

In the step S14, whether or not an intake air flow amount reaching flag FGAIROK is "1" is determined. This answer is initially a denial (NO). Then, the processing proceeds to a step S15, and an intake air amount increase control for setting the throttle valve opening TH to the switching time target opening THTGT, the ignition time delay control for delaying the ignition time IG in accordance with the increase of the intake air flow amount GAIR, and a valve operation phase control for changing the intake valve operation phase CAIN and the exhaust valve operation phase CAEX are cooperatively executed, so that a torque maintaining control for maintaining the output torque TRQ of the engine 1 so as to be target torque TRQCMD is executed. In this embodiment, as shown in FIGS. 6(d) and 6(e), the valve operation phase control for shifting the intake valve operation phase CAIN and the exhaust valve operation phase CAEX each to the predetermined intake valve operation phase CAINTGT and the predetermined exhaust valve operation phase CAEXTGT at a predetermined change speed is executed.

In a step S16, whether or not the intake air flow amount GAIR reaches the switching time target intake air flow amount GAIRTGT is determined. While the answer is a denial (NO), the processing is ended immediately. Accordingly, the torque maintenance control is continued. When the answer of the step S16 becomes an affirmative (YES), an intake air flow amount reach flag FGAIROK is set to "1" (step S17) and the processing proceeds to a step S18. Therefore, after that, the step 18 is repeatedly executed by becoming the affirmative (YES) of the answer of the step S14. In the step S18, the switching command control processing shown in FIG. 8 is executed.

Figure 8:
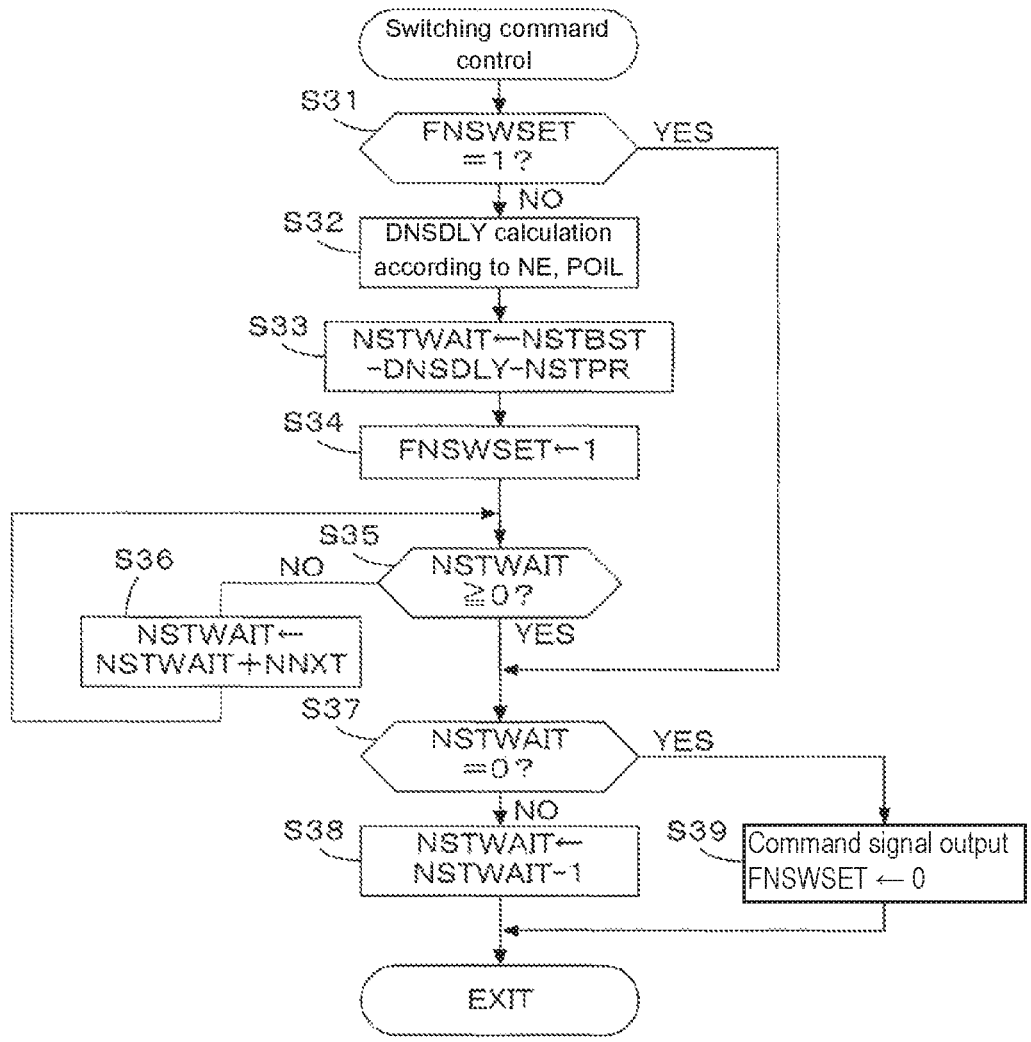
FIG. 8 is a flow chart of switching command control processing to be executed in the processing of FIG. 7.

FIG. 8 is a flow chart of the switching command control processing to be executed in the step S18 of FIG. 7. In this embodiment, the control of the valve opening command time CAOP of the electromagnetic valve 42 is performed by using a stage number NST defining the crank angle 30 degrees as one stage. The stage number NST has "0" as a reference value. It counts up "1" per a crank angle 30 degrees to "23", and the next after "23" is a parameter returning to "0" again.

Figure 9:
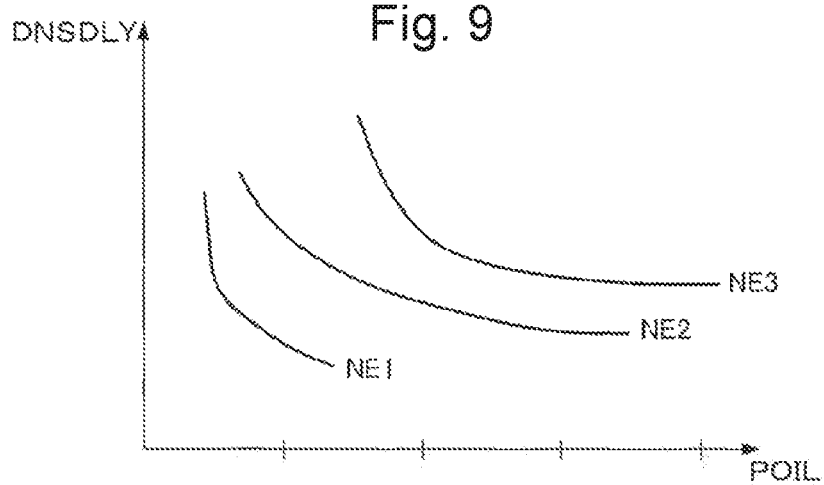
FIG. 9 is a view showing a map to be referred to in the processing of FIG. 8.

In a step S31, whether or not a waiting stage number setting flag FNSWSET is "1" is determined. This answer becomes a denial (NO) at first, and the processing proceeds to a step S32. A DNSDLY map shown in FIG. 9 is detected in accordance with the engine rotational frequency NE and the hydraulic oil pressure POIL, and a delay stage number DNSDLY corresponding to the response delay time IDLY of the cylinder deactivation mechanism 40 is calculated. A predetermined engine rotational frequency NE1, NE2 and NE3 shown in FIG. 9 satisfies a relationship of NE1<NE2<NE3. Accordingly, it is set that the DNSDLY map increases the delay stage number DNSDLY as the engine rotational frequency NE increases, and the delay stage number DNSDLY decreases as the hydraulic oil pressure POIL increases.

In a step S33, the delay stage number DNSDLY is applied to the following formula (1), and the waiting stage number NSTWAIT is calculated.

$$NSTWAIT=NSTBST-DNSDLY-NSTPR \qquad (1)$$

Herein, NSTBST is a parameter (optimum switching stage number) showing the optimum switching time suitable at a point of view of prevention of the generation of the switching noises by the stage number NST and is previously fixed by corresponding to the predetermined intake valve operation phase CAINTGT and the predetermined exhaust valve operation phase CAEXTGT. NSTPR is a stage number at which this time operation processing is executed.

In a step S34, the waiting stage number setting flag FNSWSET is set to "1". In a step S35, whether or not the waiting stage number NSTWAIT is not less than "0" is determined. Since the stage number NST is the parameter of value from "0" to "23" as mentioned above, the waiting stage number NSTWAIT calculated by the formula (1) has a possibility becoming a negative value. Accordingly, when the answer of the step S35 is the denial (NO), the processing (step 36) for adding a predetermined number NNTX to the waiting stage number NSTWAIT is repeated until the answer of the step S35 becomes the affirmative (YES). The predetermined number NNTX is set to the stage number (for example, "8") until the next switching command time suitable at a point of view of prevention of the switching noises.

When the answer of the step S35 is the affirmative (YES), the processing proceeds to a step S37, and whether or not the waiting stage number NSTWAIT is "0" is determined. When this answer is the denial (NO), the processing proceeds to a step S38, and the waiting stage number NSTWAIT is reduced by only "1". When the answer of the step S37 is the affirmative (YES), the valve opening command signal (switching command signal) of the electromagnetic valve 42 is outputted, and the waiting stage number setting flag FNSWSET is returned to "0" (step S39).

Since the answer of the step S31 becomes the affirmative (YES) after execution of the step S34, the processing proceeds to the step S37 immediately.

FIG. 10 is a time chart for explaining the processing of FIG. 8. In this drawing, CA0 is the operation time of the waiting stage number NSTWAIT.

The valve opening command signal is outputted in the time CA2 after an elapse of the waiting stage number NASWAIT0 from the operation time CA0, and the actual switching (the transition to the partial cylinder operation) is performed in the time CA3 after the elapse of the delay stage number DNSDLY0 from the time. The time CA3 is the timing which is positioned substantially in the center of an OK range ROK in which the switching noises are not generated, and the generation of the switching noises can be accurately prevented.

As mentioned above, in this embodiment, in the case where having made the switching request from the whole cylinder operation to the partial cylinder operation, the preparation control for suppressing the fluctuation of the output torque of the engine 1 at the time of executing the switching operation from the whole cylinder operation to the partial cylinder operation is executed, and the intake valve operation phase CAIN and the exhaust valve operation phase CAEX each are fixed to the predetermined intake valve operation phase CAINTGT and the predetermined exhaust valve operation phase CAEXTGT before executing the switching operation. Then, the valve opening signal (switching command signal) is outputted to the electromagnetic valve 42 based on the optimum switching stage number NSTBST prefixed by corresponding to the predetermined intake valve operation phase CAINTGT and the predetermined exhaust valve operation phase CAEXTGT. It is confirmed that the timing in which the switching noises are difficult to be generated changes depending upon the valve operation phases CAIN and CAEX. Accordingly, the optimum switching stage number NSTBST corresponding to the timing (the optimum switching time) at which the switching noises are difficult to be generated is prefixed by corresponding to the predetermined intake valve operation phase CAINTGT and the predetermined exhaust valve operation phase CAEXTGT, and the valve opening command signal is outputted based on the optimum switching stage number NSTBST, so that the generation of the switching noises can be easily prevented. Further, since the optimum switching time is not changed by fixing the intake valve operation phase CAIN and the exhaust valve operation phase CAEX prior to execution of the switching operation, the switching operation can be executed in its earlier stages and the fuel economy can be improved as compared with a case where the valve operation phases CAIN and CAEX are not fixed.

Herein, the predetermined intake valve operation phase CAINTGT and the predetermined exhaust valve operation phase CAEXTGT are set to the valve operation phases in which the OK range ROK (switching operation execution angle range corresponding to the noise absence range RNN shown in FIGS. 5A-5D) suitable to execute the switching operation of the cylinder deactivation mechanism 40 is relatively expanded, and the optimum switching stage number NSTBST which corresponds to the target switching time for executing the switching operation is set within the OK range ROK. The OK range ROK is the crank angle range in which the switching noises are not generated in the switching operation execution time, and the wide or narrow extent changes depending upon the valve operation phase. Accordingly, the predetermined intake valve operation phase CAINTGT and the predetermined exhaust valve operation phase CAEXTGT are set to the valve operation phases in which the OK range ROK is relatively expanded, so that the generation of the abnormal noises can be more accurately prevented in the switching operation execution time.

Further, since the waiting stage number NSTWAIT corresponding to the command signal output time is calculated in accordance with the delay stage number DNSDLY corresponding to the response delay time TDLY of the cylinder deactivation mechanism 40 in such a manner that the switching operation is executed at the optimum switching stage number NSTBST, the timing at which the actual switching operation is executed is allowed to coincide accurately with the optimum switching stage number NSTBST, so that the generation of the switching noises can be prevented accurately.

Further, the delay stage number DNSDLY is determined in accordance with the hydraulic oil pressure POIL supplied to the switching mechanism part 43 of the cylinder deactivation mechanism 40 and the engine rotational frequency NE. It is confirmed that the response delay time IDLY of the cylinder deactivation mechanism 40 changes depending upon the hydraulic oil pressure POIL, and further, the switching command time is required to be determined by the rotation phase (crank angle) of the engine 1. Therefore, the actual switching operation execution time can be allowed to coincide accurately with the optimum switching time by determining the delay stage number DNSDLY in accordance with the hydraulic oil pressure POIL and the engine rotational frequency NE.

In this embodiment, for example, the steps S12 and S15 of FIG. 7 correspond to steps a and b of claim 1, and the steps S32-S39 of FIG. 8 correspond to a step c of claims 1 and 3.

Modified Embodiment

FIGS. 11A-11F is a time chart for explaining a modified embodiment of the transient control shown in FIGS. 6A-6F. In this modified embodiment, the predetermined intake valve operation phase CAINTGT and the predetermined exhaust valve operation phase CAEXTGT each are set to the operation phases CAINCS and CAEXCS suitable for the partial cylinder operation. Then, the optimum switching stage number NSTBST corresponding to the optimum switching time for preventing the switching noises is previously fixed to the value corresponding to the operation phases CAINCS and CAEXCX.

When the execution condition of the partial cylinder operation is effected in the time t10, the processing for calculating the switching time target throttle valve opening THTGT and the switching time target intake air flow amount GAIRTGT and the processing for decreasing engagement degree of a lock-up clutch are executed. In the time t11, the ignition time delay control for delaying the ignition time IG by corresponding to the increase of the intake air flow amount GAIR and the valve operation phase control for shifting the intake valve operation phase CAIN and the exhaust valve operation phase CAEX to the predetermined intake valve opening phase CAINTGT and the predetermined exhaust valve operation phase CAEXTGT at a predetermined change speed are cooperatively executed by increasing the throttle valve opening TH up to the switching time target throttle valve opening THTGT. In the operation example shown in this drawing, the valve operation phase control for increasing each of the intake valve operation phase CAIN and the exhaust valve operation phase CAEX is executed.

In the time t12, the intake air flow amount GAIR reaches the switching time target intake air flow amount GAIRTGT, the preparation control for suppressing the fluctuation of the output torque in the switching operation execution time is completed, and the operation of the optimum valve opening command time CABST is performed. Then, the operation has to wait until the time t13 in which the rotation phase of the engine 1 coincides with the optimum valve opening command time CABST. In the time t13 corresponding to the optimum valve opening command time CABST, the switching operation in the switching mechanism part 43 is executed in the time t14, thereby to shift to the partial cylinder operation, by performing the valve opening command of the electromagnetic valve 42. In the time t14, the ignition time IG is set to the ignition time IGCS suitable for the partial cylinder operation. Since the intake valve operation phase CAIN and the exhaust valve operation phase CAEX are already set to the operation phases CAINCS and CAEXCS suitable for the partial cylinder operation, it will be maintained as it is.

According to this modified embodiment, the slight torque fluctuation directly after the switching operation as compared with the above mentioned embodiment can be prevented since the switching operation is executed at the timing in which the switching noises are not generated and the intake valve operation phase CAIN and the exhaust valve operation phase CAEX directly after execution of the switching operation (directly after t14) do not change.

Further, the present invention is not limited to the above mentioned embodiments, and various modifications may be made. For example, the present invention may be applied to the case where the valve operation phase variable mechanism 50 changes the operation phase with respect to only the intake valve or the exhaust valve. Further, in the above embodiments, although there is shown the internal combustion engine of 6 cylinders in which the 3 cylinders per a partial cylinder operation are operated, the present invention is not limited to the internal combustion engine of 6 cylinders and may be applied to the case of executing the partial cylinder operation in which only a part of cylinders in the internal combustion engine having the plurality of cylinders is operated.

Further, in the above mentioned embodiments, although the engine 1 is not provided with an exhaust gas recirculation mechanism, the present invention may be applied to the control method of the internal combustion engine which is provided with the exhaust gas recirculation mechanism.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A control method of an internal combustion engine which comprises a plurality of cylinders, a valve operation phase variable mechanism configured to change a valve operation phase of at least one of an intake valve and an exhaust valve provided in each of the plurality of cylinders, and a cylinder deactivation mechanism configured to perform switching between partial cylinder operation in which one of the plural cylinders is deactivated and whole cylinder operation in which all of the cylinders are operated, comprising steps of:
   (a) executing, by a computer, a preparation control for suppressing fluctuation of an output torque of the engine at a time of executing switching operation from the whole cylinder operation to the partial cylinder operation when a switching request from the whole cylinder operation to the partial cylinder operation is made;
   (b) setting and fixing, by the computer, the valve operation phase of the one of the plural cylinders subject to deactivation to a predetermined phase before executing the switching operation; and
   (c) outputting, by the computer, switching command signal to the cylinder deactivation mechanism based on a target switching time which is prefixed in accordance with the predetermined phase so as to execute the switching operation.

2. The control method of the internal combustion engine according to claim 1, wherein a crank angle range of the one of the plural cylinders which is subject to deactivation includes a noise generation range RNS and a noise absence range RNN, wherein the noise generation range RNS is a crank angle range in which switching noise is generated when switching to the partial cylinder operation and the noise absence range RNN is a crank angle range outside the noise generation range RNS, width of the noise generation range RNS and width of the noise absence range RNN vary depending upon the valve operation phase of the one of the plural cylinders subject to deactivation,
   the step (b) sets the valve operation phase of the one of the plural cylinders subject to deactivation to the predetermined phase so as to expand the noise absence range RNN, and
   the target switching time is set within the noise absence range RNN.

3. The control method of the internal combustion engine according to claim 1, wherein, in the step (c), an output time of the switching command signal is adjusted in accordance with an operation delay time of the cylinder deactivation mechanism such that the switching operation is executed at the target switching time.

4. The control method of the internal combustion engine according to claim 3, wherein the cylinder deactivation mechanism is provided with a switching device configured to switch between an operation condition and a deactivation condition of the intake valve and the exhaust valve of the cylinder to be deactivated in the partial cylinder operation, and the switching operation is executed by changing hydraulic oil pressure supplied to the switching device, and wherein the output time of the command signal is calculated in accordance with rotational frequency of the engine and the hydraulic oil pressure.

5. The control method of the internal combustion engine according to claim 1, wherein the predetermined phase includes a switching crank angle range, and the target switching time is set within the switching crank angle range.

6. The control method of the internal combustion engine according to claim 2, wherein the noise absence range RNN is a range in which a switching noise generated by the switching operation from the whole cylinder operation to the partial cylinder operation is suppressed.

7. The control method of the internal combustion engine according to claim 5, wherein the switching crank angle range is advanced or delayed depending on the change of the valve operation phase.

8. A non-transitory computer-readable medium that stores therein a program causing a computer to execute a control process of an internal combustion engine which comprises a plurality of cylinders, a valve operation phase variable mechanism configured to change a valve operation phase of at least one of an intake valve and an exhaust valve provided in each of the plurality of cylinders, and a cylinder deactivation mechanism configured to perform switching between partial cylinder operation in which one of the plural cylinders is deactivated and whole cylinder operation in which all of the cylinders are operated the process comprising:
   (a) executing a preparation control for suppressing fluctuation of an output torque of the engine at a time of executing switching operation from the whole cylinder operation to the partial cylinder operation when a switching request from the whole cylinder operation to the partial cylinder operation is made;

(b) setting and fixing the valve operation phase of the one of the plural cylinders subject to deactivation to a predetermined phase before executing the switching operation; and
(c) outputting switching command signal to the cylinder deactivation mechanism based on a target switching time which is prefixed in accordance with the predetermined phase so as to execute the switching operation.

* * * * *